(12) United States Patent
Wuidart

(10) Patent No.: US 7,005,967 B2
(45) Date of Patent: *Feb. 28, 2006

(54) VALIDATION OF THE PRESENCE OF AN ELECTROMAGNETIC TRANSPONDER IN THE FIELD OF AN AMPLITUDE DEMODULATION READER

(75) Inventor: Luc Wuidart, Pourrieres (FR)

(73) Assignee: STMicroelectronics S.A., Montrouge (FR)

( * ) Notice: Subject to any disclaimer, the term of this patent is extended or adjusted under 35 U.S.C. 154(b) by 717 days.

This patent is subject to a terminal disclaimer.

(21) Appl. No.: 09/854,144

(22) Filed: May 11, 2001

(65) Prior Publication Data

US 2002/0008611 A1 Jan. 24, 2002

(30) Foreign Application Priority Data

May 12, 2000 (FR) .................................. 00 06061

(51) Int. Cl.
*H04Q 5/22* (2006.01)

(52) U.S. Cl. ................. 340/10.4; 340/10.1; 340/10.34; 340/10.2; 340/572.1; 340/572.7; 340/480; 340/870.32; 340/870.31; 342/118; 342/127

(58) Field of Classification Search ............... 340/10.4, 340/10.1, 10.34, 572.1, 572.7, 870.31, 870.32, 340/10.2, 480; 455/41.1; 342/118, 127
See application file for complete search history.

(56) References Cited

U.S. PATENT DOCUMENTS

| | | | |
|---|---|---|---|
| 2,411,555 A | 11/1946 | Rogers | |
| 3,618,089 A | 11/1971 | Moran Jr. et al. | |
| 4,068,232 A | 1/1978 | Meyers et al. | |
| 4,209,783 A | 6/1980 | Ohyama et al. | |
| 4,258,348 A * | 3/1981 | Belfer et al. | ............ 336/73 |
| 4,278,977 A | 7/1981 | Nossen | |
| 4,375,289 A | 3/1983 | Schmall et al. | |
| 4,408,185 A | 10/1983 | Rasmussen | |
| 4,593,412 A | 6/1986 | Jacob | |
| 4,656,472 A | 4/1987 | Walton | |
| 4,660,192 A | 4/1987 | Pomatto, Sr. | |
| 4,673,932 A | 6/1987 | Ekchian et al. | |
| 4,706,050 A | 11/1987 | Andrews | |
| 4,782,308 A | 11/1988 | Trobec et al. | |
| 4,802,080 A | 1/1989 | Bossi et al. | |

(Continued)

FOREIGN PATENT DOCUMENTS

DE 28 35 549 A1 3/1979

(Continued)

OTHER PUBLICATIONS

French Search Report from French Patent Application No. 99 09563, filed Jul. 20, 1999.

(Continued)

*Primary Examiner*—Michael Horabik
*Assistant Examiner*—Vernal Brown
(74) *Attorney, Agent, or Firm*—Lisa K. Jorgenson; James H. Morris; Wolf, Greenfield & Sacks, P.C.

(57) ABSTRACT

A terminal for generating an electromagnetic field adapted to communicating with at least one transponder, and a method for controlling such a terminal including: an oscillating circuit adapted to being excited by a remote supply signal of the transponder; an amplitude demodulator for detecting possible data transmitted by the transponder; circuitry for regulating the signal phase in the terminal's oscillating circuit on a reference value; circuitry for measuring variables linked to the current in the oscillating circuit and to the voltage thereacross; and circuitry for comparing current values of these variables to predetermined values, to determine the presence of a transponder.

33 Claims, 5 Drawing Sheets

U.S. PATENT DOCUMENTS

| | | | |
|---|---|---|---|
| 4,814,595 A | 3/1989 | Gilboa | |
| 4,827,266 A | 5/1989 | Sato et al. | |
| 4,928,108 A | 5/1990 | Kropielnicki et al. | |
| 4,963,887 A | 10/1990 | Kawashima et al. | |
| 5,013,898 A | 5/1991 | Glasspool | |
| 5,055,853 A | 10/1991 | Garnier | |
| 5,084,699 A | 1/1992 | DeMichele | |
| 5,099,227 A | 3/1992 | Geiszler et al. | |
| 5,126,749 A | 6/1992 | Kaltner | |
| 5,142,292 A | 8/1992 | Chang | |
| 5,202,644 A | 4/1993 | Brady | |
| 5,214,409 A | 5/1993 | Beigel | |
| 5,235,326 A | 8/1993 | Beigel et al. | |
| 5,305,008 A | 4/1994 | Turner et al. | |
| 5,324,315 A | 6/1994 | Grevious | |
| 5,451,958 A | 9/1995 | Schuermann | |
| 5,452,344 A | 9/1995 | Larson | |
| 5,493,267 A | 2/1996 | Ahlse et al. | |
| 5,504,485 A | 4/1996 | Landt et al. | |
| 5,519,381 A | 5/1996 | Marsh et al. | |
| 5,521,602 A | 5/1996 | Carroll et al. | |
| 5,541,604 A | 7/1996 | Meier | |
| 5,550,536 A | 8/1996 | Flaxl | |
| 5,604,411 A | 2/1997 | Venkitasubrahmanian et al. | |
| 5,619,529 A | 4/1997 | Fujioka | |
| 5,621,411 A | 4/1997 | Hagl et al. | |
| 5,691,605 A | 11/1997 | Xia et al. | |
| 5,698,837 A | 12/1997 | Furuta | |
| 5,698,838 A | 12/1997 | Yamaguchi | |
| 5,701,121 A | 12/1997 | Murdoch | |
| 5,703,573 A | 12/1997 | Fujimoto et al. | |
| 5,767,503 A | 6/1998 | Gloton | |
| 5,801,372 A | 9/1998 | Yamaguchi | |
| 5,831,257 A | 11/1998 | Yamaguchi | |
| 5,850,416 A | 12/1998 | Myer | |
| 5,874,725 A | 2/1999 | Yamaguchi | |
| 5,883,582 A | 3/1999 | Bowers et al. | |
| 5,889,273 A | 3/1999 | Goto | |
| 5,905,444 A | 5/1999 | Zimmer | |
| 5,955,950 A | 9/1999 | Gallagher, III et al. | |
| 6,014,088 A | 1/2000 | Van Santbrink et al. | |
| 6,025,780 A | 2/2000 | Bowers et al. | |
| 6,028,503 A | 2/2000 | Preishuberpflugl et al. | |
| 6,034,640 A | 3/2000 | Oida et al. | |
| 6,070,803 A | 6/2000 | Stobbe | |
| 6,070,804 A | 6/2000 | Miyamoto | |
| 6,072,383 A | 6/2000 | Gallagher, III et al. | |
| 6,075,491 A | 6/2000 | Dakeya et al. | |
| 6,100,788 A | 8/2000 | Frary | |
| 6,137,411 A | 10/2000 | Tyren | |
| 6,150,986 A | 11/2000 | Sandberg et al. | |
| 6,154,635 A | 11/2000 | Ohta | |
| 6,172,608 B1 | 1/2001 | Cole | |
| 6,208,235 B1 | 3/2001 | Trontelj | |
| 6,229,443 B1 | 5/2001 | Roesner | |
| 6,243,013 B1 | 6/2001 | Duan et al. | |
| 6,265,962 B1 | 7/2001 | Black et al. | |
| 6,272,320 B1 | 8/2001 | Nandra et al. | |
| 6,272,321 B1 | 8/2001 | Bruhnke et al. | |
| 6,281,794 B1 | 8/2001 | Duan et al. | |
| 6,304,169 B1 | 10/2001 | Blama et al. | |
| 6,307,468 B1 | 10/2001 | Ward, Jr. | |
| 6,307,517 B1 | 10/2001 | Lee | |
| 6,335,665 B1 * | 1/2002 | Mendelsohn | 333/139 |
| 6,356,738 B1 | 3/2002 | Schneider et al. | |
| 6,393,045 B1 | 5/2002 | Belcher et al. | |
| 6,424,820 B1 | 7/2002 | Burdick et al. | |
| 6,441,804 B1 | 8/2002 | Hsien | |
| 6,446,049 B1 | 9/2002 | Janning et al. | |
| 6,491,230 B1 | 12/2002 | Dubost et al. | |
| 6,498,923 B1 | 12/2002 | Ikefuji et al. | |
| 6,617,962 B1 | 9/2003 | Horwitz et al. | |
| 6,646,543 B1 | 11/2003 | Mardinian et al. | |
| 6,650,226 B1 | 11/2003 | Wuidart et al. | |
| 6,650,227 B1 | 11/2003 | Bradin | |
| 6,650,229 B1 | 11/2003 | Wuidart et al. | |
| 6,654,466 B1 * | 11/2003 | Ikefuji et al. | 380/270 |
| 6,690,229 B1 | 2/2004 | Rudolph | |
| 6,703,921 B1 | 3/2004 | Wuidart et al. | |
| 2003/0227323 A1 | 12/2003 | Enguent | |

FOREIGN PATENT DOCUMENTS

| | | |
|---|---|---|
| DE | 44 44 984 | 12/1994 |
| DE | 195 46 928 | 6/1997 |
| DE | 196 21 076 | 11/1997 |
| DE | 196 32 282 A1 | 2/1998 |
| EP | 0 038 877 | 11/1981 |
| EP | 0 369 622 | 5/1990 |
| EP | 0 568 067 A | 11/1993 |
| EP | 0 579 332 A1 | 1/1994 |
| EP | 0 645 840 A | 3/1995 |
| EP | 0 768 540 | 4/1997 |
| EP | 0 857 981 A1 | 8/1998 |
| EP | 0 902 475 A | 3/1999 |
| FR | 2 114 026 | 6/1972 |
| FR | 2 746 200 | 9/1997 |
| FR | 2 757 952 | 7/1998 |
| GB | 2 298 553 A | 9/1996 |
| GB | 2 321 726 A1 | 8/1998 |
| JP | 407245946 A | 9/1995 |
| JP | 10-145267 | 5/1998 |
| JP | 10-203066 | 8/1998 |
| WO | WO 93/17482 | 9/1993 |
| WO | WO 98/20363 | 5/1998 |
| WO | WO 99/33017 | 7/1999 |
| WO | WO 9943096 | 8/1999 |

OTHER PUBLICATIONS

French Search Report from French Patent Application No. 99 08025, filed Jun. 22, 1998.
French Search Report from French Patent Application No. 99 04547, filed Apr. 7, 1999.
French Search Report from French Patent Application No. 99 04546, filed Apr. 7, 1999.
French Search Report from French Patent Application No. 98 08024, filed Jun. 22, 1999.
French Search Report from French Patent Application No. 99 04548, filed Apr. 7, 1999.
French Search Report from French Patent Application No. 99 04544, filed Apr. 7, 1999.
French Search Report from French Patent Application No. 00/01214, filed Jan. 31, 2000.
French Search Report from French Patent Application No. 99 09564, filed Jul. 20, 1999.
French Search Report from French Patent Application No. 00/06301, filed May 17, 2000.
French Search Report from French Patent Application No. 99 04548, filed Apr. 7, 1999.
French Search Report from French Patent Application No. 99 04545, filed Apr. 7, 1999.
French Search Report from French Patent Application No. 99 07024, filed May 31, 1999.
French Search Report from French Patent Application No. 00 06302, filed May 17, 2000.
French Search Report from French Patent Application No. 99 04549, filed Apr. 7, 1999.
French Search Report from French Patent Application No. 00 06065, filed May 12, 2000.

French Search Report from French Patent Application No. 00 06061, filed May 12, 2000.
French Search Report from French Patent Application No. 00 06064, filed May 12, 2000.

French Search Report from French Patent Application No. 00 06071, filed May 12, 2000.

* cited by examiner

VALIDATION OF THE PRESENCE OF AN ELECTROMAGNETIC TRANSPONDER IN THE FIELD OF AN AMPLITUDE DEMODULATION READER

BACKGROUND OF THE INVENTION

1. Field of the Invention

The present invention relates to systems using electromagnetic transponders, that is, transceivers (generally mobile) capable of being interrogated in a contactless and wireless manner by a unit (generally fixed), called a read and/or write terminal. Generally, transponders extract the power supply required by the electronic circuits included therein from the high frequency field radiated by an antenna of the read and write terminal.

2. Discussion of the Related Art

FIG. 1 very schematically shows a conventional example of a data exchange system of the type to which the present invention relates between a read/write terminal 1 and a transponder 10.

Generally, terminal 1 is essentially formed of a series oscillating circuit formed of an inductance L1 in series with a capacitor C1 and a resistor R1, between an output terminal 2 of an amplifier or antenna coupler 3 and a terminal 4 at a reference potential (generally, the ground). Amplifier 3 receives a high-frequency transmission signal E, provided by a modulator 5 (MOD1), which receives a reference frequency (signal OSC), for example, from a quartz oscillator (not shown). Modulator 5 receives, if necessary, a data signal Tx to be transmitted and, in the absence of a data transmission from the terminal, provides the high-frequency carrier (for example, at 13.56 MHz) adapted to remotely supply a transponder. In receive mode, terminal 1 uses a demodulator 6 (DEMOD1), which is used to detect a load variation generated by transponder 10 on the high-frequency signal. Demodulator 6 samples, for example, the voltage across terminals 7 and 4 of capacitor C1, and provides a signal Rx of data received after demodulation.

Other circuits, not shown, generally complete a terminal 1. Among these circuits, a circuit for controlling and exploiting the received data most often based on a microprocessor for processing the control signals and the data, may be included, among others. These circuits generally communicate with different input/output circuits (keyboard, screen, means of transmission to a server, etc.) and/or processing circuits, not shown. The circuits of the read/write terminal draw the power required by their operation from a supply circuit (not shown) connected, for example, to the electric supply system or to batteries.

A transponder 10, intended for cooperating with a terminal 1, essentially includes a parallel oscillating circuit formed of an inductance L2, in parallel with a capacitor C2 between two input terminals 11, 12 of a control and processing circuit 13. Terminals 11, 12 are in practice connected to the input of a rectifying means (not shown), outputs of which form D.C. supply terminals of the circuits internal to the transponder. These circuits generally include, essentially, a microprocessor 14 (P) capable of communicating with other elements (for example, a memory) through connections 15. Transponder 10 further includes a demodulator 16 (DEMOD2) of the signals received from terminal 1, which provides a signal Rx' to circuit 14, and a modulator 17 (MOD2) for transmitting to the terminal data Tx' that it receives from circuit 14.

The oscillating circuits of the terminal and of the transponder are generally tuned on a same frequency corresponding to the frequency of an excitation signal of the terminal's oscillating circuit. This high-frequency signal (for example, at 13.56 MHz) is not only used as a transmission carrier but also as a remote supply carrier for the transponder(s) located in the terminal's field. When a transponder 10 is located in the field of a terminal 1, a high-frequency voltage is generated across terminals 11 and 12 of its resonant circuit. This voltage, after being rectified and possibly clipped, is intended for providing the supply voltage of electronic circuits 13 of the transponder. For clarity, the rectifying, clipping, and supply means have not been shown in FIG. 1. It should be noted that, generally, the demodulation (block 16) is performed upstream of the clipping means to keep the amplitude modulation of the data on the high-frequency carrier transmitted by the terminal. This amplitude modulation is performed according to different coding techniques to transmit data and/or control signals to the transponders. In return, data transmission Tx' from the transponder to a terminal is generally performed by modulating the load formed by resonant circuit L2, C2. This is why modulator 17 has been shown in parallel with this resonant circuit. The load variation is performed at the rate of a so-called back-modulation sub-carrier, of a frequency (for example, 847.5 kHz) smaller than that of the carrier.

The load variation coming from a transponder can then be detected by the terminal in the form of an amplitude variation or of a phase variation by means, for example, of a measurement of the voltage across capacitor C1 or of the current in the oscillating circuit by means of demodulator 6.

The present invention more specifically applies to systems having a read and/or write terminal using an amplitude demodulation to detect the load variation of a transponder in its field and thus demodulate the transmitted data.

A problem that is posed in conventional electromagnetic transponder systems is that a transponder remotely supplied by a terminal and transmitting data to said terminal may be undetected by the terminal, that is, the terminal's demodulator cannot manage to detect the presence of a data modulation. This phenomenon is generally called a "demodulation gap". For a given system, this corresponds to a relative position of a terminal and of a transponder to which the terminal's demodulator is "blind".

It should be noted that this notion of a demodulation gap is different from what is called a "remote supply gap" where the transponder cannot manage to be supplied by the high-frequency signal, even though it is in the terminal's electromagnetic field. Indeed, there exists a relative position between a transponder and a terminal at which the magnetic coupling between oscillating circuits is such that the transponder is not supplied, that is, the voltage recovered across terminals 11 and 12 of its oscillating circuit is too small for it to operate. In a demodulation gap, the transponder is properly supplied. It generally properly detects the data transmitted by the terminal in amplitude modulation. It properly transmits data to the terminal in back-modulation, by variation of the load of its oscillating circuit. However, the terminal's demodulator does not detect this back-modulation.

As a result of this demodulation gap problem, a terminal cannot detect a transponder present in its field since this detection conventionally uses the result of the data demodulator on the terminal side. In particular, when it is in a stand-by state, waiting for a transmission, the terminal periodically transmits interrogation requests by modulating the amplitude of the remote supply carrier. The terminal then monitors the output of its demodulator, which will indicate thereto the presence of a transponder. Indeed, where a transponder is "woken up" by its entering the field of a terminal, it demodulates the interrogation message periodically transmitted by this terminal and answers it to have itself identified.

An additional disadvantage is that, since the transponder has received data from the terminal, it believes that it is identified by the terminal, which is not true. The only present techniques to isolate this phenomenon are to multiply the information exchanges to validate the transmission, which is costly in terms of transmission duration.

Different transponder systems of the type to which the present invention applies are described, for example, in U.S. Pat. Nos. 4,963,887 and 5,550,536, as well as in European patent applications no. 0,722,094 and 0,857,981, all of which are incorporated herein by reference.

In a read/write terminal provided with an amplitude demodulator, the output voltage of a demodulator annuls, that is, there is a demodulation gap, in two frequency configurations of the carrier (13.56 MHz) which, for a given coupling coefficient between the oscillating circuits of the terminal and of the involved transponder, surround the self-resonant frequency of oscillating circuit L2–C2 of the transponder. Ideally, the median frequency corresponds to the perfect tuning of the terminal and of the transponder on the remote supply carrier frequency, where the amplitude available for the demodulation is maximum.

It is generally desired to have both the oscillating circuits of the terminal and of the transponder tuned on the remote supply carrier frequency, to maximize the remote supply power received by the transponder. However, the manufacturing tolerances of the capacitors used for the oscillating circuits, especially for capacitor C2 of the transponder, which is generally integrated, generally are on the order of 10%. As a result of the extent of these manufacturing tolerances, perfect tuning is practically not respected and it cannot be guaranteed that a transponder entering the field of a terminal will not be, in a given coupling position, in a demodulation gap.

Further, the position of demodulation gaps in the amplitude demodulator response varies according to the mutual inductance between the oscillating circuits. Now, this mutual inductance depends on the distance separating antennas L1 and L2 of the terminal and of the transponder, and thus on the relative position of the transponder with respect to the terminal upon transmission.

The combined problems of the existence of demodulation gaps and of the variation of the position of these demodulation gaps with respect to the distance between the inductances, associated with the manufacturing tolerances of the components, make conventional systems rather unreliable.

SUMMARY OF THE INVENTION

The present invention aims at overcoming the disadvantages of conventional systems relative to the presence of demodulation gaps in the response of the demodulator of a read/write terminal.

More specifically, the present invention aims at providing a novel control method that makes a read/write terminal insensitive to demodulation gaps of the data that it receives from a transponder having entered its field.

The present invention also aims at providing a novel terminal insensitive to demodulation gaps of the data that it receives from a transponder having entered its field.

The present invention also aims at providing a solution which requires no modification of the transponders and which is accordingly compatible with existing transponders.

The present invention further aims at providing a solution that is particularly well adapted to a terminal equipped with an amplitude demodulator.

To achieve these and other objects, the present invention provides a terminal for generating an electromagnetic field adapted to communicating with at least one transponder entering this field, including: an oscillating circuit adapted to being excited by a high-frequency remote supply signal of the transponder; an amplitude demodulator for detecting possible data transmitted by the transponder by modulating, at the rate of a sub-carrier, the load that it forms on the terminal's oscillating circuit; means for regulating the signal phase in the terminal's oscillating circuit in response to a reference value having a long response time as compared to said sub-carrier; means for measuring variables linked to the current in the oscillating circuit and to the voltage thereacross; and means for comparing present values of these variables to predetermined values.

According to an embodiment of the present invention, the terminal further includes means for deactivating said phase regulation means, and means for forcing the value of a settable element of the oscillating circuit.

According to an embodiment of the present invention, said settable element is formed of a variable capacitive element of the terminal's oscillating circuit.

According to an embodiment of the present invention, the settable element is common to the phase regulation means and to the forcing means.

The present invention also provides a method for controlling a terminal, including of exploiting the results of the comparison means to detect the presence of a transponder in the terminal's field.

According to an embodiment of the present invention, the method includes of, in the absence of a useful signal of sufficient amplitude to enable detection of data by the demodulator and if a transponder has been detected by the comparison of the current and predetermined values, deactivating the phase regulation means and forcing the value of the settable element of the oscillating circuit to a value such that said variables recover said predetermined values.

According to an embodiment of the present invention, said predetermined values correspond to values measured and stored during an off-load operation of the terminal, while no transponder is present in its field.

According to an embodiment of the present invention, the method includes of forcing the value of the settable element to a value determined by the phase regulation means during the off-load operation.

The foregoing objects, features and advantages of the present invention, will be discussed in detail in the following non-limiting description of specific embodiments in connection with the accompanying drawings.

DETAILED DESCRIPTION

Figure 1:
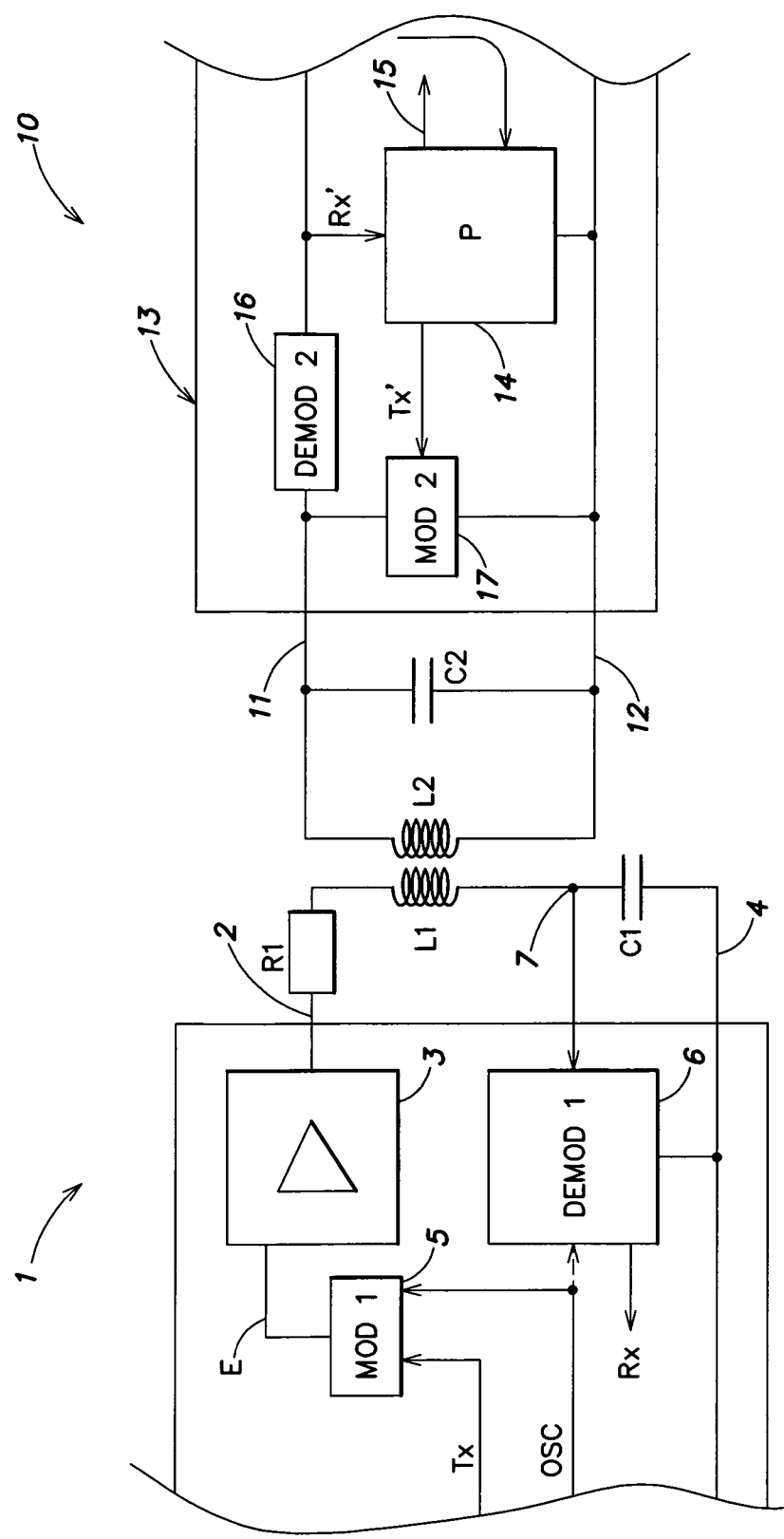
FIG. 1 very schematically shows a conventional example of an electromagnetic transponder system.

The same elements have been referred to with the same references in the different drawings. For clarity, only those elements of a terminal and of a transponder and only those steps of the information exchange process which are necessary to the understanding of the present invention have been illustrated in the drawings and will be described hereafter. In particular, the details constitutive of the modulators and demodulators have not been detailed and are within the abilities of those skilled in the art based on the functional indications given hereafter. Further, the present invention will be discussed in relation with transponders using a so-called "resistive" back-modulation to vary the load that they form on the terminal's oscillating circuit (the capacitances of the oscillating circuits of the transponders being fixed), but it should be noted that the present invention more generally applies to any type of back-modulation, for example to a so-called "capacitive" back-modulation.

A feature of the present invention is to provide a direct determination of the presence of a transponder in the field of a read/write terminal, that is, without it being necessary to interpret demodulated data transmission signals coming from the transponder. More specifically, the present invention provides, in case of an absence of a demodulated signal usable by the terminal, validating the absence of a transponder in the field thereof by another determination independent from the existence of a data transmission.

Another feature of the present invention is to provide, in case of an incoherence between the result of the demodulator and of the direct determination, a corrective action enabling the terminal's demodulator to correctly interpret the received data. This corrective action is preferentially performed on the terminal's oscillating circuit and, preferably, on the capacitive element of this circuit.

The determination of the presence or the absence of a transponder in the terminal's field is performed, according to the present invention, by a measurement of the current in the terminal's oscillating circuit and of the voltage across its capacitive element (or of variables directly linked to the current and to the voltage), and by comparing the obtained current values with previously-stored values. The latter preferably correspond to values measured in a learning phase where the reader is in a specific configuration.

Figure 2:
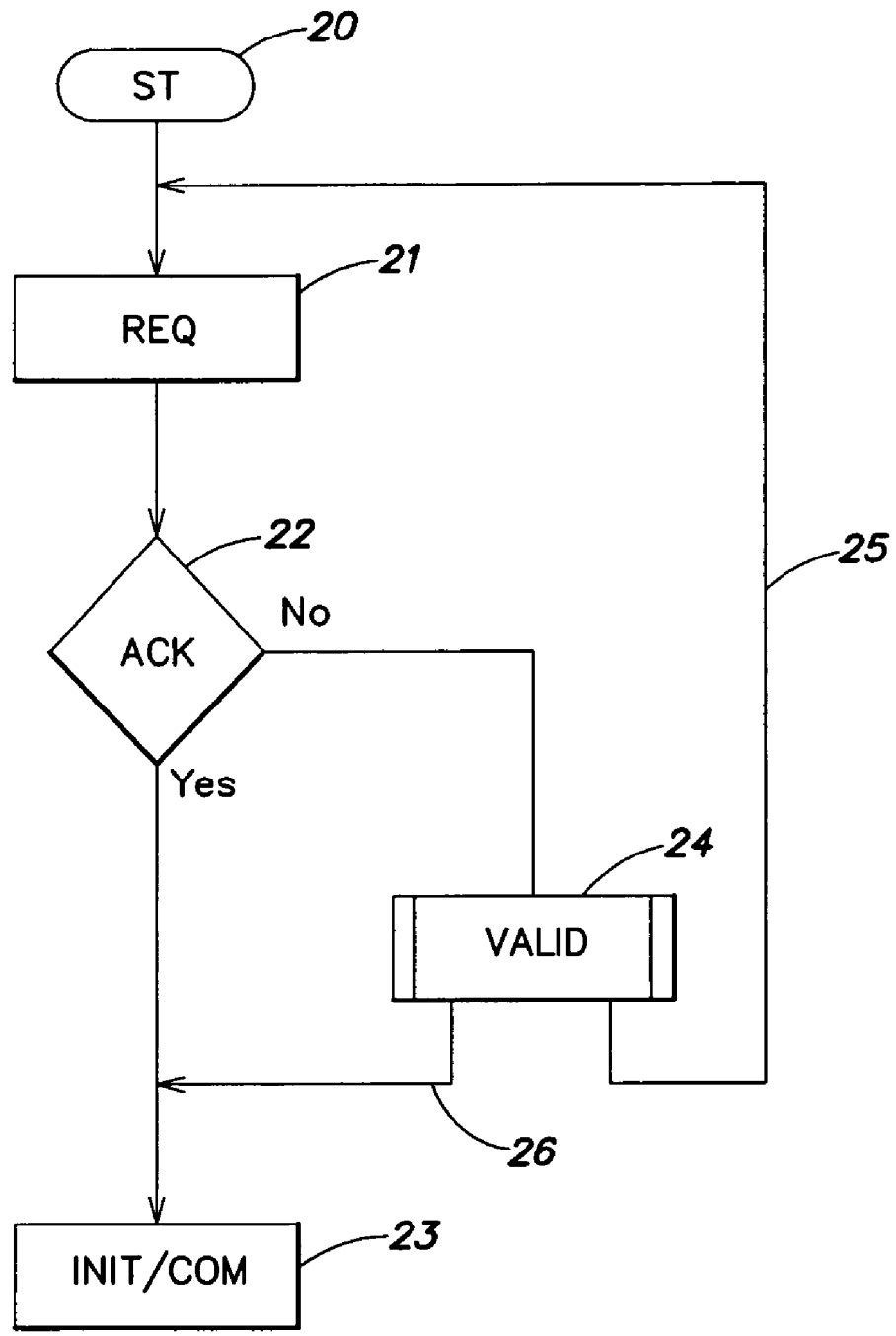
FIG. 2 shows, in the form of a simplified flowchart, an embodiment of the method for validating the presence of a transponder according to the present invention.

FIG. 2 is a simplified flowchart of a mode of implementation of a sequence of validation of the presence of a transponder in the terminal's field, applied to the stand-by state of a read/write terminal.

As soon as it is powered on and in operation, a transponder read/write terminal begins (block 20, ST), after a starting, set and test phase, a stand-by procedure during which it waits for a communication with a transponder to be established. This procedure includes periodically sending (block 21) a request sequence (REQ) to the possible transponder(s) present in the terminal's field. After each sending of an interrogation request 21, the reader monitors (block 22) the reception, by its demodulator, of an acknowledgement message (ACK) coming from a transponder having entered its field.

In a conventional method (not shown), in the absence of an acknowledgement, the reader loops on the sending of a request 21. When its receives an acknowledgement ACK, it switches to a mode of checking whether the transponder really is a transponder intended therefor, as well as to a possible anti-collision mode (block 23, INIT/COM) to individualize several transponders that may be present in the field. Indeed, as a response to an interrogation request by a terminal, if several transponders are present in the field thereof, they may respond at the same time or with a sufficiently low time interval to make the result of the demodulation by the reader unexploitable. Said reader must then either select a transponder with which it wishes to communicate, or assign different channels to the different transponders.

A communication only starts when the initialization and anti-collision process illustrated in FIG. 2 by block 23 is over. As soon as a given transponder has been properly identified, it is placed in a state where it no longer acknowledges interrogation requests to avoid polluting the detection of the other possible transponders.

An initialization and anti-collision process of the type briefly described hereabove is known. Illustrations of conventional methods are for example to be found in French patent applications no. 2,760,280 and 2,773,627, which are hereby incorporated by reference.

Be it during stand-by procedures or during a communication, the terminal exploits the results provided by its demodulator.

According to the present invention, each time the reader expects to obtain a result from its demodulator and this result is negative (block 22), a validation procedure of the present invention (block 24, VALID) is implemented.

If the implementation of the method of the present invention validates the absence of a transponder in the terminal's field, the conventional sending of an interrogation request (link 25) is resumed. However, if the checking performed by the present invention invalidates the demodulator result and indicates that a transponder must be present in the terminal's field, a corrective action is performed on its oscillating circuit before carrying on the communication initialization (link 26).

To get rid of the problem of tolerance and drift of the transponders' oscillating circuit components, the values of these elements being further likely to vary from one transponder to another, it is provided according to the present invention to regulate the phase of the terminal's oscillating circuit with respect to a reference value. According to the present invention, this phase regulation is performed by means of a loop having a response time chosen so that the loop is sufficiently slow to avoid disturbing the possible back-modulation from the transponder and sufficiently fast as compared to the passing speed of a transponder in the terminal's field. This can be called a static regulation with respect to the modulation frequencies (for example, the 13.56-MHz remote supply carrier frequency and the 847.5-kHz back-modulation frequency used in the data transmission from the transponder to the terminal).

Such a phase control of the terminal's oscillating circuit can be implemented by using known means such as those described, for example, in above-mentioned European patent application no. 0,857,981. The adaptation of the system provided by this document to implement the present invention, or of another known phase control system, is within the abilities of those skilled in the art based on the functional indications given in the present description.

Due to the use of a phase regulation loop, current and voltage measurements in the terminal's oscillating circuit can now be exploited to deduce therefrom, according to the present invention, an information relative to the presence of one or several transponders in the field.

The current, designated by I, in the terminal's series oscillating circuit (for example, measured by a current transformer) is linked to the so-called generator voltage (Vg), exciting the oscillating circuit and to the apparent impedance $Z1_{app}$ of the oscillating circuit by the following relation:

$$Z1_{app} = \frac{Vg}{I} \qquad (1)$$

Now, considering that the series inductance and resistance of the terminal's oscillating circuit have fixed and immutable values, at least for a given terminal, the excitation voltage of the oscillating circuit is proportional by a constant coefficient to the voltage (VC1) across the capacitive element of the terminal. Accordingly, evaluating the apparent impedance of the terminal's oscillating circuit amounts to evaluating the ratio between the voltage across the capacitive element and the current in the oscillating circuit.

The evaluation of the presence of a transponder performed by the present invention exclusively uses the current information in the terminal's oscillating circuit and the voltage information thereacross, more specifically across its capacitive element (or information directly linked, by invariable and determined coefficients, to these variables).

According to the present invention, the so-called "off-load" values of the current and of the voltage are used when no transponder is present in the terminal's field. These electric magnitudes are easily measurable on the read/write terminal side, for example, in a learning phase, for example following the implantation of the terminal in its application site.

Afterwards, by evaluating the current ratio (or a linked information) between the voltage across the capacitive element and the current in the oscillating circuit, the presence of a transponder in the field can be deduced.

Figure 3:
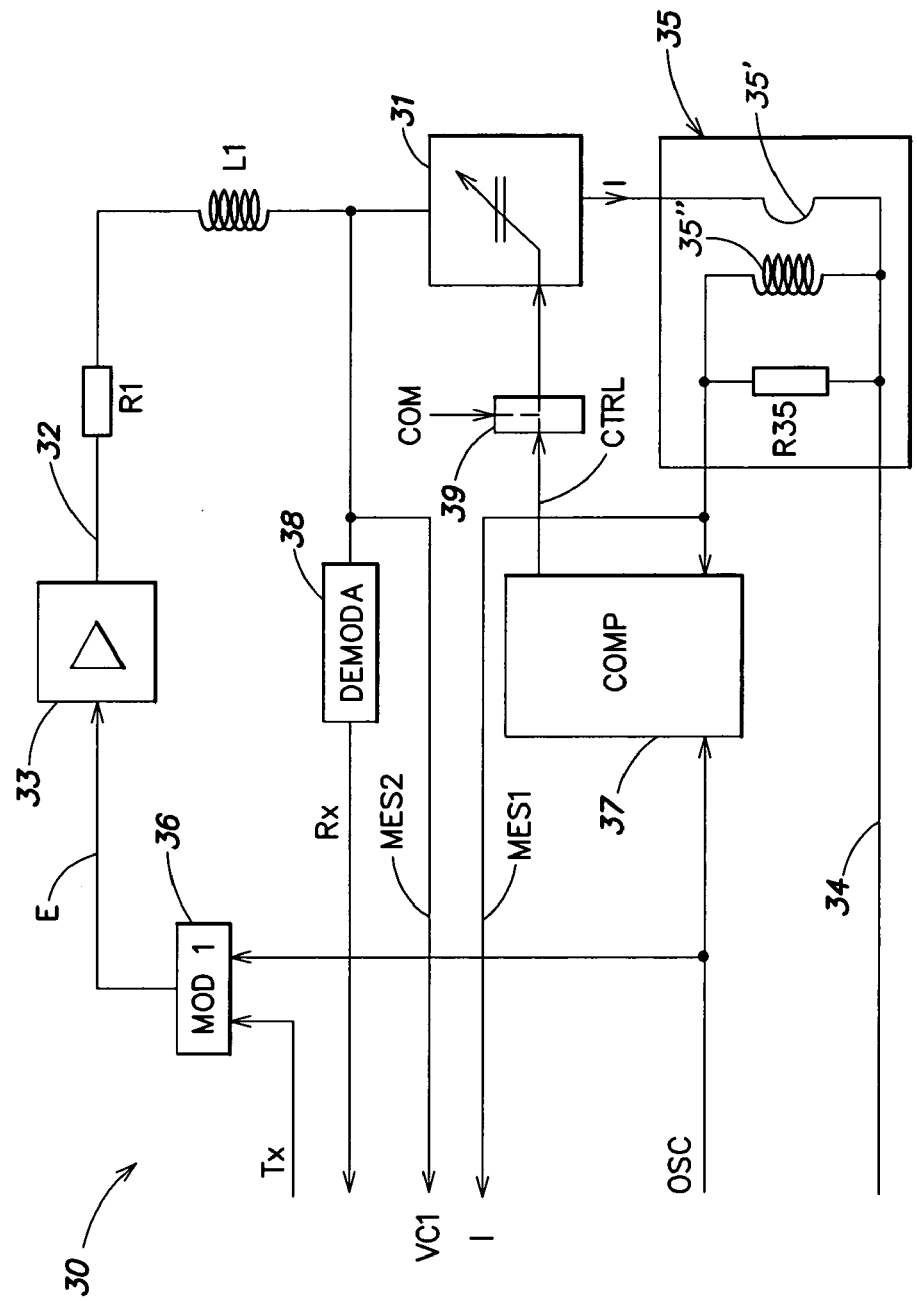
FIG. 3 partially and schematically shows an embodiment of an amplitude demodulation read/write terminal according to the present invention.

FIG. 3 schematically shows, in a simplified manner, an embodiment of a read/write terminal according to the present invention, equipped with a phase regulation loop of the oscillating circuit and with an amplitude demodulator.

Conventionally, terminal 30 includes an oscillating circuit formed of an inductance or antenna L1, in series with a capacitive element 31 and a resistive element R1, between an output terminal 32 of an amplifier or antenna coupler 33 and a terminal 34 at a reference potential (generally, the ground). An element 35 for measuring the current in the oscillating circuit is interposed, for example, between capacitive element 31 and ground 34. Measurement element 35 is especially used to provide the information about the current (I) intended for the data exploitation means on the terminal side formed, for example, of a microprocessor (not shown). Amplifier 33 receives a high-frequency transmission signal E, coming from a modulator 36 (MOD1) which receives a reference frequency (signal OSC), for example, from a quartz oscillator (not shown). Modulator 36 receives, if necessary, a signal Tx of data to be transmitted and, in the absence of any data transmission from the terminal, provides the high-frequency carrier (for example at 13.56 MHz) adapted to remotely supplying a transponder. Capacitive element 31 is a variable-capacitance element controllable by a signal CTRL.

A phase regulation of the current in antenna L1 is performed with respect to a reference signal. This regulation is a regulation of the high-frequency signal, that is, of the carrier signal corresponding to signal E in the absence of data to be transmitted. This regulation is performed by varying the capacitance of the oscillating circuit of terminal 30 to maintain the current in the antenna in a constant phase relation with the reference signal which corresponds, for example, to signal OSC provided by the modulator's oscillator. However, the regulation is sufficiently slow to only take into account the static phase variations with respect to the back-modulation carrier. Signal CTRL originates from a circuit 37 (COMP) having the function of detecting the phase interval with respect to the reference signal and accordingly modifying the capacitance of element 31. In the present example, the phase measurement is performed from a measurement of current I in the circuit by means of current transformer 35 connected in series with element 31. This transformer generally is formed of a primary winding 35' between element 31 and the ground, and of a secondary winding 35", a first terminal of which is directly connected to ground 34 and a second terminal of which provides a signal MES1 depending on current I, sent to comparator 37 which accordingly controls capacitive element 31 by means of signal CTRL.

According to the present invention, signal MES1 is also sent, as previously indicated, to the microprocessor or the like to implement the validation method of the present invention. A second measurement signal MES2, providing an information relative to voltage VC1 across capacitive element 31, is also sent to the microprocessor. This signal is sampled, for example, between inductance L1 and element 31.

Terminal 30 further includes an amplitude demodulator 38 (DEMODA) receiving as an input, for example, voltage VC1 (or an image of the current) across capacitive element 31 (more specifically across the series association of capacitive element 31 and of current sensor 35) and providing as an output a signal Rx giving back a possible back-modulation of data received from a transponder to the rest of the terminal's electronic circuits, not shown.

Figure 4:
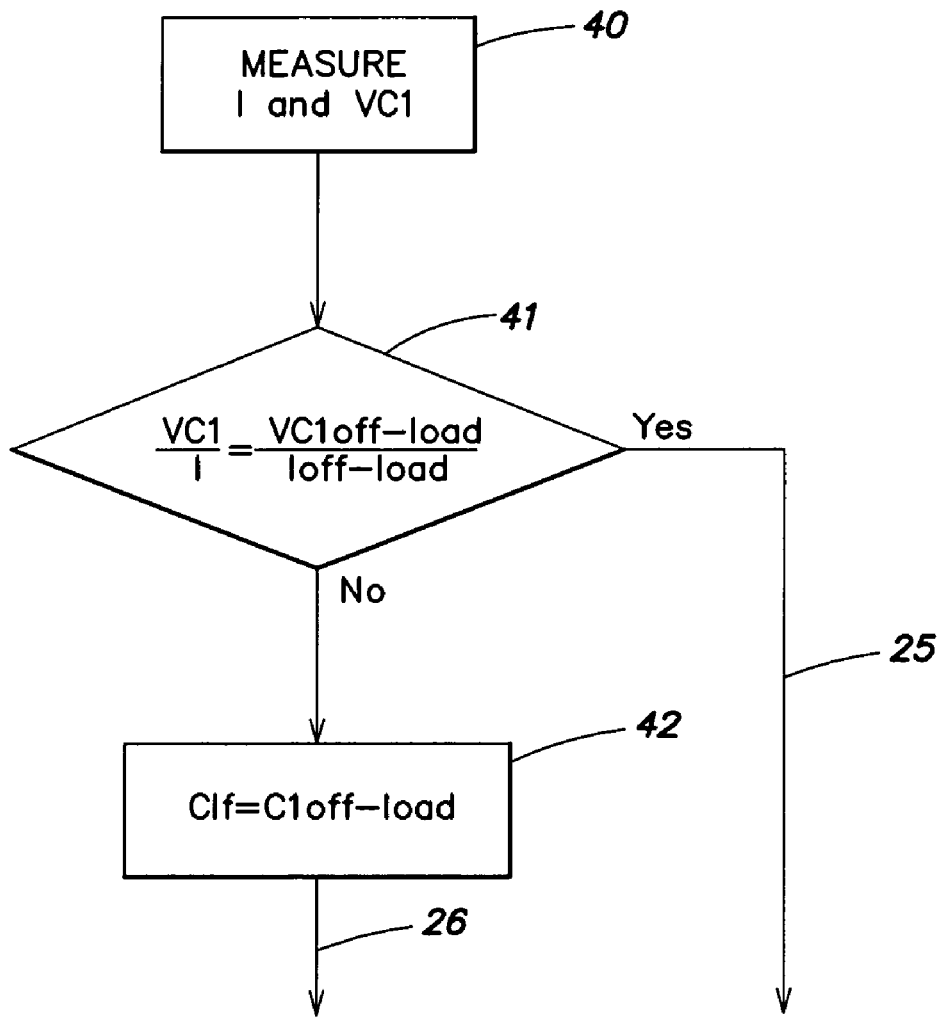
FIG. 4 illustrates, in the form of a flowchart, a mode of implementation of the validation method of the present invention.

FIG. 4 is a flowchart of an embodiment of the validation method (block 24, FIG. 2) of the present invention.

As previously indicated, current I and voltage VC1 are first measured (block 40) in the oscillating circuit. Then, the ratio of voltage VC1 on current I is compared (block 41) to the same values, measured off-load ($VC1_{off-load}$ and $I_{off-load}$) in a learning phase. If the two ratios are identical, this means that no transponder is present in the terminal's field and the validation process provides this information (link 25). However, if the two ratios are different, this means that the demodulator is in a demodulation gap even though a transponder is present in the terminal's field.

Indeed, imaginary part $X1_{app}$ of apparent impedance $Z1_{app}$ of the terminal's oscillating circuit can be expressed as:

$$X1_{app} = X1 - a^2 X2, \qquad (2)$$

where X1 represents the imaginary part of the impedance of the terminal's oscillating circuit, that is:

$$X1 = L1 \cdot \omega - \frac{1}{C1 \cdot \omega}, \qquad (3)$$

where X2 represents the imaginary part of the transponder's oscillating circuit, that is:

$$X2 = L2 \cdot \omega - \frac{1}{C2 \cdot \omega}, \quad (4)$$

and with:

$$a^2 = \frac{k^2 \cdot \omega^2 \cdot L1 \cdot L2}{X2^2 + R2^2}, \quad (5)$$

where $\omega$ represents the pulse and where R2 represents the load formed by the transponder's oscillating circuits on its own oscillating circuit, modeled by a resistor in parallel with inductance L2 and capacitor C2. In other words, resistor R2 represents the equivalent resistance of all the circuits (microprocessors, back-modulation means, etc.) of the transponder, added in parallel on capacitor C2 and inductance L2.

Due to the phase regulation, imaginary part $X1_{app}$ is null. Accordingly:

$$X1 = a^2 \cdot X2. \quad (6)$$

Based on these relations, the difference between the current and off-load values can be expressed as follows:

$$X1 - X1_{off-load} = a^2 X2 - a_{off-load}^2 X2. \quad (7)$$

Now, coefficient $a_{off-load}$ is null since the off-load coupling is also null. Further, voltage VC1 across element 31 (neglecting the influence of intensity transformer 35) can be written as $I/\omega C1$. As a result, formula (7) hereabove can be written as:

$$a^2 X2 = \frac{VC1_{off-load}}{I_{off-load}} - \frac{VC1}{I}. \quad (8)$$

If above expression 8 is different from zero, this not only means that a transponder is present in the terminal's field, but also that, for this transponder, variable X2 is different from 0, that is, its oscillating circuit is out of tune, even slightly. This is consistent with the fact that the transponder transmits data to the terminal, that is, it modifies the load that it forms on the terminal's oscillating circuit.

In other words, it can be considered that the above formula annuls in two cases only. The first case corresponds to the case where no transponder is present in the terminal's field. The second case is that where capacitor C2 of the transponder's oscillating circuit is perfectly tuned on the remote supply carrier. In this case, X2=0.

In practice, technological dispersions and operating drifts of the transponder result in variations by more or less 10% of the capacitance of capacitor C2 with respect to a tuning value $C2_{tun}$. Further, nothing can generally be done on the transponder to correct these variations. This is in particular why the phase regulation loop improves or optimizes the remote supply of the transponder by compensating for these possible drifts by modifying the tuning on the read/write terminal side.

The correction performed according to the present invention to come out of a demodulation gap includes, preferably, forcing the value of capacitance C1 of element 31 on a predetermined value in the learning phase. This choice is linked to the fact that the phase regulation is preferably performed by modifying the capacitance of the oscillating circuit. Accordingly, a variable capacitive element, the value of which can be adjusted, is provided, either to statically control the phase in the oscillating circuit, or to force the value of the capacitive element to shift the circuit tuning when in the presence of a demodulation gap.

The forcing of the value of capacitance C1 is performed, for example, by means of a signal COM issued by the processor (not shown) to a circuit 39 for selecting the control set point of element 31 between signal CTRL provided by circuit 37 and the forcing value. The practical implementation of this function is within the abilities of those skilled in the art. It may for example be provided that signal COM carrying the predetermined set point of capacitance C1 always holds the priority with respect to signal CTRL carrying the controlled set point, or an additional control signal (not shown) may be provided to select one of the two inputs of circuit 39. As an alternative, the phase regulator may be modified to be able to impose a different set point value to it, enabling the forced value of capacitance C1 to be provided by signal CTRL.

It should be noted that by forcing the value of the capacitance, the phase in the oscillator is then no longer regulated. However, this correction of the present invention only intervenes in very specific cases where the demodulator is "blind". The regulation value of the capacitance is, of course, recovered as soon as this situation disappears, for example, as soon as the communication with the involved transponder ends.

The correction performed according to the present invention includes of forcing (block 42) capacitance C1 of element 31 of the oscillating circuit to a value $C1_f$ equal to the value $C1_{off-load}$ that it has off-load. This value of the off-load capacitance can easily be stored in the learning phase where the off-load current and voltage have been measured. The initialization process (FIG. 2) carries on (link 26) based on this new capacitance value.

Figure 5:
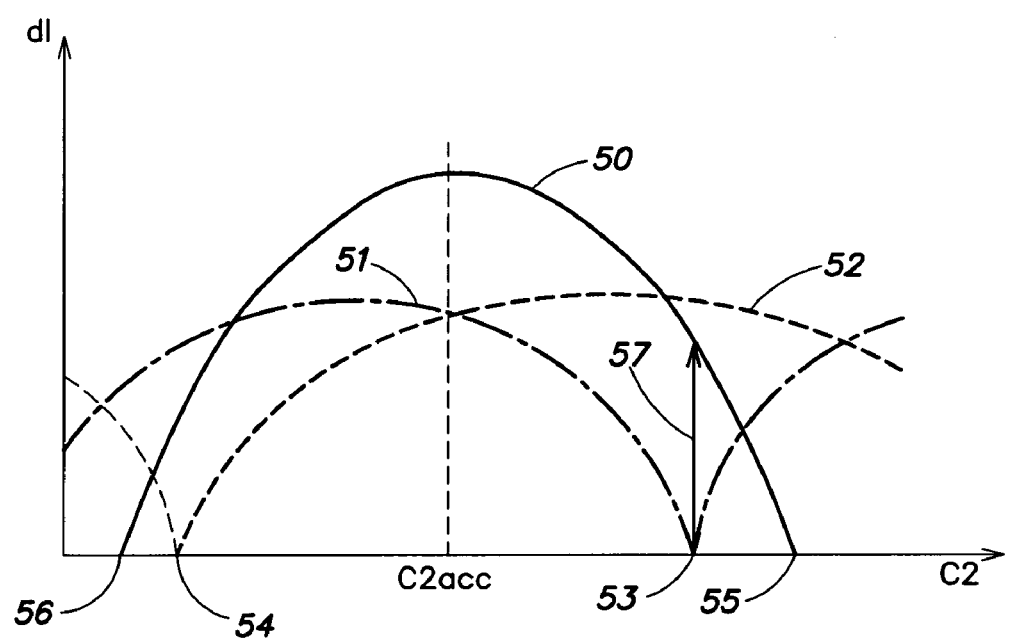
FIG. 5 shows examples of the shape of the amplitude of the signal to be demodulated available at the input of the amplitude demodulator of a read/write terminal according to the capacitance of the oscillating circuit of a transponder in the field of this terminal.

FIG. 5 illustrates the implementation of the method of the present invention by showing three examples of variation amplitudes dI of current I, available for the amplitude demodulator according to capacitance C2 of the transponder present in the terminal's field. In other words, this illustrates the signal available to exploit a back-modulation coming from a transponder by means of the amplitude demodulator.

Variation dI corresponds, as a first approximation, to voltage variation dV across element 31, and represents the signal to be detected by amplitude demodulator 38. This is thus a "dynamic" variation (at the rate of the back-modulation remote carrier, for example, 847.5 kHz).

A first curve 50 plotted in full line corresponds to the ideal case where the imaginary part of impedance X1 (formula 3) of the terminal's oscillating circuit is null. This means that the terminal's oscillating circuit is perfectly tuned, including in its dynamic operation. This case is ideal since, given that the reader is provided with a phase loop, which is static with respect to the variations generated by the back-modulation (for example at 847.5 kHz), apparent value $X1_{app}$ is statically null (formula 2). It will be recalled that the essential aim of the static phase loop is to improve or optimize the tuning according to the transponder's load to obtain an optimal remote supply range thereof. Shape 50 forms a sort of bell centered on value C2tun of the capacitance of a transponder perfectly tuned on the remote supply carrier.

With respect to this ideal case, two types of curves can be defined, respectively 51 in stripe-dot lines and 52 in dotted lines corresponding to two real cases where imaginary part X1 of the terminal's oscillating circuit is respectively positive or negative. The case where imaginary part X1 is positive means that the value of capacitance C1 of element 31 is greater than value $C1_{off-load}$. Conversely, the case where imaginary part X1 is negative corresponds to a value of C1 smaller than $C1_{off-load}$. In each of curves 51 and 52, points, respectively 53 and 54, appear in which the variation of current dI is null. These points correspond to demodulation gaps. It should be noted that curve 50 corresponding to the ideal case also exhibits two zero crossings 55 and 56, that is, two demodulation gaps. However, points 55 and 56 correspond, in practice, to values of capacitance C2 coming out of the tolerance and drift ranges. Gaps 55 and 56 surround points 53 and 54.

The implementation of the correction provided by the present invention corresponds to displacing the operating point of the reader to reach the ideal curve (shape 50). This action is symbolized by a double arrow 57 at the level of point 53 taken as an example. When a demodulation gap is identified, the value of capacitance C1 is forced to its off-load value. The terminal is then pulled out of the demodulation gap, and its demodulator then has enough signal amplitude to read the message sent by the transponder.

According to a specific embodiment, where variable-capacitance capacitive element 31 is formed of a diode or of a transistor, the junction capacitance of which is varied by modifying the voltage applied across its terminals, it can be considered that this control voltage corresponds to voltage VC1. In this case, it is possible to only store, in a learning phase, the value of the off-load capacitance as well as the off-load current. Then, as soon as a demodulation gap is detected, element C1 is biased to a value $VC1_{off-load}$ that is calculated by the following formula:

$$VC1_{off-load} = \frac{I_{off-load}}{\omega \cdot C1_{off-load}}. \quad (9)$$

An advantage of the present invention is that by means of a determination of easily measurable electric variables, the reliability of the operation of a read/write terminal of electromagnetic transponders is considerably improved.

Another advantage of the present invention is that the only intervention is on the read/write terminal side. Accordingly, the operation of the transponder present in the terminal's field is not modified and the present invention can be implemented with existing conventional transponders.

Another advantage of the present invention is that by choosing to intervene on the setting variable of the static phase regulation loop, structural modifications of the terminal are reduced or minimized.

Another advantage of the present invention is that it makes the operation of the transponder system insensitive to demodulation gaps.

Another advantage of the present invention is that the implemented correction does not adversely affect the transponder remote supply.

Another advantage of the present invention is that it requires no adaptation according to the demodulator sensitivity. It can even be considered that it automatically adapts to a variation of the demodulation gap. Indeed, since the correction performed by the present invention is implemented based on the result of the demodulation, it is independent from the demodulator's detection threshold.

Of course, the present invention is likely to have various alterations, modifications, and improvements which will readily occur to those skilled in the art. In particular, the practical implementation of the validation process of the present invention by means of the conventional components of a read/write terminal is within the abilities of those skilled in the art based on the functional indications given hereabove and on the considered application.

Further, although reference has been made in the foregoing description to the presence of a transponder with which the terminal is to communicate, the present invention also applies to the case where several transponders must communicate with a same terminal. In a simplified way, it can then be provided to force the value of capacitance C1 as soon as one of the transponders has been identified as posing a demodulation gap problem. It is then considered that the attenuation of the useful signal that may result therefrom for the other transponders is bearable. However, in a preferred embodiment, account is taken of the fact that the value forced for a transponder has a risk, even slight, of placing another transponder in a demodulation gap. It is then provided to individualize the values of the capacitances of element 31 of the terminal to the different transponders. This is possible when the communications of several transponders with the same terminal are separated in time channels. Then, either the values of capacitance C1 can be stored upon detection of the transponders and one of these values can be imposed upon each channel switching (and thus transponder switching), or the validation steps (block 24, FIG. 2) can be provided upon each beginning of transmission of a data sequence from a transponder to the terminal. An advantage of this last solution is that it then takes into account the possible motions of a transponder during communication. It should be noted that it is possible to implement this last solution in the case of a single transponder to take account of this last advantage.

Moreover, in the foregoing description, it has been considered that the value of capacitance C2 is fixed, that is, that the back-modulation is performed by varying equivalent resistance R2. However, the present invention transposes to the case of a "capacitive" back-modulation that modifies the value of capacitance C2 at the sub-carrier rate. In this case, the demodulation gaps depend on resistance R2 and thus vary according to the consumption of the transponder circuits. The above-discussed detection principle is not modified. The correction will simply be adapted on the terminal side.

Finally, although the determination based on the voltage across capacitive element 31 is a solution that is particularly simple to implement, account may be taken of an equivalent voltage sampled at other points, provided that it is linked to the voltage across the terminal's oscillating circuit and that it is responsive (dynamically) to the variations caused by the back-modulation of a transponder.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A terminal for generating an electromagnetic field adapted to communicating with at least one transponder entering this field, including:
    an oscillating circuit adapted to being excited by a high-frequency remote supply signal of the transponder;
    an amplitude demodulator for detecting possible data transmitted by the transponder by modulating, at the rate of a sub-carrier, a load that the transponder forms on the terminal's oscillating circuit;

and including:
  means for regulating a signal phase in the terminal's oscillating circuit in response to a reference value, the means having a long response time as compared to the rate of said sub-carrier;
  means for measuring variables linked to a current in the oscillating circuit and to a voltage thereacross; and
  means for comparing present values of these variables to predetermined values.

2. The terminal of claim 1, further including:
  means for deactivating said phase regulation means; and
  means for forcing a value of a settable element of the oscillating circuit.

3. The terminal of claim 2, wherein said settable element is formed of a variable capacitive element of the oscillating circuit of the terminal.

4. The terminal of claim 2, wherein the settable element is common to the phase regulation means and to the forcing means.

5. A method for controlling a terminal for generating an electromagnetic field adapted to communicating with at least one transponder entering this field, the terminal including: an oscillating circuit adapted to being excited by a high-frequency remote supply signal of the transponder; an amplitude demodulator for detecting possible data transmitted by the transponder by demodulating, at the rate of a sub-carrier, a load that it forms on the terminal's oscillating circuit; means for regulating a signal phase in the terminal's oscillating circuit in response to a reference value having a long response time as compared to said sub-carrier; means for measuring variables linked to a current in the oscillating circuit and to a voltage thereacross; and means for comparing present values of these variables to predetermined values the method comprising:
  exploiting the results of the comparison means to detect a presence of a transponder in the terminal's field.

6. The method of claim 5, including, in the absence of a useful signal of sufficient amplitude to enable detection of data by the demodulator and if a transponder has been detected by the comparison of the current and predetermined values:
  deactivating the phase regulation means; and
  forcing the value of the settable element of the oscillating circuit to a value such that said variables recover said predetermined values.

7. The method of claim 5, wherein said predetermined values correspond to values measured and stored during an off-load operation of the terminal, while no transponder is present in its field.

8. The method of claim 7, including forcing the value of the settable element to a value determined by the phase regulation means during the off-load operation.

9. A system for generating an electromagnetic field adapted to communicate with at least one transponder entering the electromagnetic field, comprising:
  an oscillating circuit adapted to being excited by a high-frequency remote supply signal of the transponder;
  an amplitude demodulator to detect possible data transmitted by the at least one transponder by demodulating a load formed on the oscillating circuit by the at least one transponder; and
  detection circuitry to detect that the at least one transponder is present in the electromagnetic field even if the amplitude demodulator has not detected any data transmitted by the at least one transponder.

10. The system of claim 9, wherein the detection circuitry comprises:
  means for detecting that the transponder has entered the electromagnetic field even if the amplitude demodulator has not detected any data transmitted by the transponder during the entry.

11. The system of claim 9, wherein the detection circuitry enables the terminal to be insensitive to demodulation gaps of data transmitted by the at least one transponder when present within the electromagnetic field.

12. The system of claim 9, further comprising:
  a correction circuit to change a value of an element of the oscillator in response to detecting that the at least one transponder is present in the electromagnetic field when the amplitude demodulator has not detected any data transmitted by the at least one transponder.

13. The system of claim 12, wherein the oscillating circuit comprises a variable capacitive element, and wherein the correction circuit is operative to change a value of the variable capacitive element in response to detecting that the at least one transponder is present in the electromagnetic field when the amplitude demodulator has not detected any data transmitted by the at least one transponder.

14. The system of claim 9, wherein the detection circuitry comprises a current transformer to measure the current in the oscillating circuit.

15. The system of claim 9, wherein the detection circuitry is operative to detect the voltage across the oscillating circuit.

16. The system of claim 9, further comprising:
  an oscillator to generate a reference signal of the terminal from which the electromagnetic field is generated; and
  phase regulation circuitry to detect a phase interval between the reference signal and a current through the oscillating circuit, and to generate a control signal to modify a value of an element of the oscillating circuit based on the detected phase interval.

17. The system of claim 16, wherein the oscillating circuit comprises a variable capacitive element, and wherein the phase regulation circuitry is operative to generate the control signal to modify a value of the variable capacitive element based on the detected phase interval.

18. A method of detecting a presence of at least one transponder within an electromagnetic field generated by a terminal that comprises an oscillating circuit, the method comprising:
  determining that the at least one transponder is not present in the electromagnetic field by performing amplitude demodulation on the oscillating circuit; and
  ascertaining whether the determination is correct based on a voltage measured across the oscillating circuit and a current measured in the oscillating circuit.

19. The method claim 18, wherein the step of determining comprises determining that data has not been transmitted in the electromagnetic field by the at least one transponder.

20. The method of claim 18, wherein the step of ascertaining comprises determining that the at least one transponder is present in the electromagnetic field.

21. The method of claim 18, wherein the step of ascertaining comprises:
  measuring the voltage across the oscillating circuit;
  measuring the current in the oscillating circuit; and
  comparing a ratio of the measured voltage and the measured current to a predetermined ratio.

22. The method of claim 21, wherein the predetermined ratio corresponds to a voltage measured across the oscillating circuit and a current measured in the oscillating circuit when no transponder was present in the electromagnetic field.

23. The method of claim 18, further comprising:
changing a value of an element of the oscillating circuit if the ratios are different.

24. The method of claim 23, wherein the oscillating circuit comprises a variable capacitive element, and wherein the step of changing a value comprises changing a value of the variable capacitive element.

25. The method of claim 18, further comprising:
generating a reference signal of the terminal from which the electromagnetic field is generated;
detecting a phase interval between the reference signal and a current through the oscillating circuit; and
modifying a value of an element of the oscillating circuit based on the detected phase interval.

26. The method of claim 25, wherein the oscillating circuit comprises a variable capacitive element, and wherein the step of modifying includes modifying a value of the variable capacitive element.

27. The terminal of claim 1, wherein the means for regulating is operative to maintain a constant phase relationship between a signal in the oscillating circuit and a reference signal.

28. The system of claim 9, further comprising:
a phase regulating circuit to regulate a phase of a signal in the oscillating circuit.

29. The system of claim 28, wherein the phase regulating circuit is operative to maintain a constant phase relationship between the signal in the oscillating circuit and a reference signal.

30. The system of claim 28, further comprising:
a circuit to deactivate the phase regulation of the oscillating circuit in response to the amplitude demodulator not detecting any data transmitted by the at least one transponder and the detection circuitry detecting that the at least one transponder is present in the electromagnetic field.

31. The method of claim 18, further comprising regulating a phase of a signal in the oscillating circuit.

32. The method of claim 31, wherein the regulating comprises maintaining a constant phase relationship between the signal in the oscillating circuit and a reference signal.

33. The method of claim 31, wherein the ascertaining ascertains that the determination is incorrect,
wherein the method further comprising deactivating the regulation of the phase in response to the ascertaining.

* * * * *